US012057628B2

(12) United States Patent
Wu et al.

(10) Patent No.: US 12,057,628 B2
(45) Date of Patent: *Aug. 6, 2024

(54) SINGLE-POLARIZED ANTENNA

(71) Applicant: KUNSHAN HAMILTON COMMUNICATION TECHNOLOGY CO., LTD, Suzhou (CN)

(72) Inventors: Zihan Wu, Jiangsu (CN); Congying Yan, Jiangsu (CN); Feng Sheng, Jiangsu (CN); Zhaoying Song, Jiangsu (CN)

(73) Assignee: Kunshan Hamilton Communication Technology Co., Ltd, Jiangsu (CN)

( * ) Notice: Subject to any disclaimer, the term of this patent is extended or adjusted under 35 U.S.C. 154(b) by 603 days.

This patent is subject to a terminal disclaimer.

(21) Appl. No.: 17/273,804

(22) PCT Filed: Jun. 5, 2020

(86) PCT No.: PCT/CN2020/094689

§ 371 (c)(1),
(2) Date: Mar. 5, 2021

(87) PCT Pub. No.: WO2020/244635

PCT Pub. Date: Dec. 10, 2020

(65) Prior Publication Data

US 2021/0320405 A1 Oct. 14, 2021

(30) Foreign Application Priority Data

Jun. 6, 2019 (CN) ......................... 201910492495.7

(51) Int. Cl.
*H01Q 1/50* (2006.01)
*H01P 5/12* (2006.01)
(Continued)

(52) U.S. Cl.
CPC ................. *H01Q 1/50* (2013.01); *H01P 5/12* (2013.01)

(58) Field of Classification Search
CPC ...... H01Q 21/24; H01Q 13/14; H01Q 13/085; H01Q 1/36
See application file for complete search history.

(56) References Cited

U.S. PATENT DOCUMENTS

2005/0122276 A1* 6/2005 Louzir ................. H01Q 19/062 343/770
2013/0009834 A1* 1/2013 Hefele ..................... H01Q 9/32 343/770
(Continued)

FOREIGN PATENT DOCUMENTS

CN 1612412 A 5/2005
CN 102804501 A 11/2012
(Continued)

OTHER PUBLICATIONS

Author: Zhang Yuwei Title: A Printed Broadband Low Profile Omni-directional Dual Polarization Antenna; Date: Sep. 11, 2018 (Year: 2018).*
(Continued)

*Primary Examiner* — Wei (Victor) Y Chan
(74) *Attorney, Agent, or Firm* — BARNES & THORNBURG LLP; Jeffrey R. Stone

(57) ABSTRACT

Provided is a single-polarized antenna. This single-polarized antenna includes a power divider and a Vivaldi oscillator array. The Vivaldi oscillator array includes multiple Vivaldi oscillator units uniformly distributed in a circumferential direction of the Vivaldi oscillator array. The power divider includes multiple output ports in one-to-one correspondence with the multiple Vivaldi oscillator units. The multiple output ports of the power divider are coupled to the multiple Vivaldi oscillator units in a one-to-one correspondence.

6 Claims, 7 Drawing Sheets

(51) Int. Cl.

| | |
|---|---|
| ***H01Q 1/36*** | (2006.01) |
| ***H01Q 13/14*** | (2006.01) |
| ***H01Q 21/24*** | (2006.01) |

(56) References Cited

U.S. PATENT DOCUMENTS

| | | | | |
|---|---|---|---|---|
| 2016/0164190 | A1* | 6/2016 | Daurer | H01Q 9/40 343/770 |
| 2018/0241124 | A1* | 8/2018 | Jamaly | H01Q 5/55 |
| 2022/0302587 | A1* | 9/2022 | Leung | H01Q 9/065 |

FOREIGN PATENT DOCUMENTS

| | | | |
|---|---|---|---|
| CN | 106463838 | A | 2/2017 |
| CN | 206585067 | U | 10/2017 |
| CN | 107845858 | A | 3/2018 |
| CN | 107946765 | A | 4/2018 |
| CN | 109193131 | A | 1/2019 |
| CN | 110112561 | A | 8/2019 |
| CN | 110197950 | A | 9/2019 |

OTHER PUBLICATIONS

Author: Chen Ping Title:High-Gain Vivaldi Array Antenna Loaded With Director; Date: Nov. 21, 2017 (Year: 2017).*

Author: Li, Dong-Ming, Title: A miniaturiezed vivaldi antennal Date: Aug. 31, 2016 (Year: 2016).*

International Search Report issued in PCT/CN2020/094689, mailed Sep. 8, 2020.

* cited by examiner

SINGLE-POLARIZED ANTENNA

This application is a U.S. National Stage Application of PCT Application Ser. No. PCT/CN2020/094689, filed Jun. 5, 2020, which claims priority to Chinese Patent Application No. 201910492495.7 filed. Jun. 6, 2019 with the CNIPA, the disclosures of which are incorporated herein by reference in their entireties.

TECHNICAL FIELD

Embodiments of this application relate to the technical field of antennas, for example, a single-polarized antenna.

BACKGROUND

With the arrival of the era of the 5th-Generation mobile communication technology (5G), data in a request is larger and larger. In this case, the bandwidth of the communication system in the era of the third/fourth-Generation mobile communication (3G/4G) is unable to satisfy future communication requirements. The communication system needs a broader bandwidth, and accordingly, the bandwidth of multiple antennas also needs to be expanded. Moreover, a request for coverage of Wireless-Fidelity (WiFi) on various occasions is more and more popular. To save resources and reduce difficulties in network installation, multiple operators share the network. In this manner, the communication system needs a broader frequency band. Meanwhile, for the expansion of the communication system in the future, network constructors also hope to include the coverage of WiFi in the same network system. Therefore, the operators urgently need an ultra-wideband antenna.

At present, the coverage bandwidth of an antenna on the market is mostly 698-960 MHz or 1695-2700 MHz and the antenna has a very poor omnidirectional performance. Problems are described below. First, the coverage bandwidth is relatively narrow, which does not satisfy the requirements of the ultra-wideband. Moreover, due to the limitations of traditional design principles, the product is relatively large in size. Even if the size of the product can be made relatively small, the product performance is sacrificed in most cases and the omnidirectional characteristic of the product is also rather poor.

SUMMARY

This application provides a single-polarized antenna. This single-polarized antenna has the advantages of relatively wide coverage bandwidth, better omnidirectional performance, and miniaturization.

An embodiment of this application provides a single-polarized antenna. The single-polarized antenna includes a power divider and a Vivaldi oscillator array.

The Vivaldi oscillator array includes multiple Vivaldi oscillator units uniformly distributed in a circumferential direction of the Vivaldi oscillator array.

The power divider includes multiple output ports in one-to-one correspondence with the multiple Vivaldi oscillator units. The multiple output ports of the power divider are coupled to the multiple Vivaldi oscillator units in a one-to-one correspondence.

DETAILED DESCRIPTION

An embodiment of this application provides a single-polarized antenna. This single-polarized antenna includes a power divider and a Vivaldi oscillator array.

The Vivaldi oscillator array includes multiple Vivaldi oscillator units uniformly distributed in a circumferential direction of the Vivaldi oscillator array.

The power divider includes multiple output ports in one-to-one correspondence with the multiple Vivaldi oscillator units. The multiple output ports of the power divider are coupled to the multiple Vivaldi oscillator units in a one-to-one correspondence.

The single-polarized antenna provided in an embodiment of this application includes a Vivaldi oscillator array and a power divider for feeding the Vivaldi oscillator array. The Vivaldi oscillator array includes multiple Vivaldi oscillator units uniformly distributed in a circumferential direction of the Vivaldi oscillator array. The power divider includes multiple output ports. The multiple output ports of the power divider are coupled and connected to the multiple Vivaldi oscillator units in a one-to-one correspondence. In this manner, the power divider is coupled to and feeds the Vivaldi oscillator units through the output ports of the power divider so that the Vivaldi oscillator units radiate electrical signals outward. The Vivaldi oscillator units have the advantages of a wide frequency band and a small size. Therefore, a single-polarized antenna with a relatively small size has a relatively wide coverage bandwidth, thereby avoiding the case where a single-polarized antenna in the related art has a relatively narrow coverage bandwidth. Moreover, the Vivaldi oscillator units are uniformly distributed in a circumferential direction of the Vivaldi oscillator array so that the Vivaldi oscillator array radiates uniform electrical signals in the circumferential direction of the Vivaldi oscillator array, and thus the Vivaldi oscillator array has a better omnidirectional characteristic.

Figure 1:
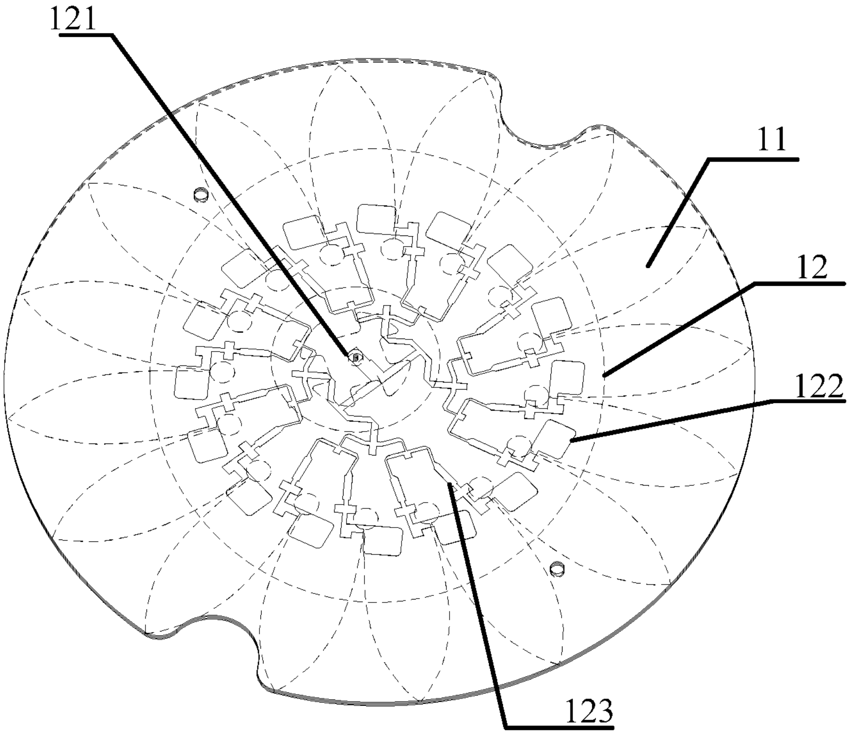
FIG. 1 is a structure view of a single-polarized antenna according to an embodiment of this application.

Referring to FIG. 1, FIG. 1 is a structure view of a single-polarized antenna according to an embodiment of this application. The single-polarized antenna includes a power divider 12 and a Vivaldi oscillator array 11. The power divider 12 includes an input port 121 and multiple output ports 122. The power divider 12 receives a current signal through the input port 121 and distributes the current signal to the multiple output ports 122 for output through feeders 123. Exemplarily, the power divider 12 is an equal power divider. The power divider 12 evenly divides the current signal received through the input port 121 into equal parts with the same number of the output ports 122 so that each output port 122 can output the same current signal. Referring to FIG. 1, the Vivaldi oscillator array 11 includes multiple Vivaldi oscillator units corresponding to the multiple output ports 122 one-to-one. The multiple Vivaldi oscillator units are uniformly distributed in a circumferential direction of the Vivaldi oscillator array 11 so that the signals output by the output ports 122 may be uniformly radiated in the circumferential direction of the Vivaldi oscillator array 11. Therefore, the Vivaldi oscillator array 11 has a better omnidirectional characteristic. Moreover, the Vivaldi oscillator units have a relatively wide coverage bandwidth, which enables the single-polarized antenna to have the advantages of miniaturization and ultra-wideband. Exemplarily, the ultra-wideband single-polarized antenna provided in this embodiment can cover a bandwidth of 700-6000 MHz and cover a mobile communication frequency band and frequency bands such as World Interoperability for Microwave Access (WiMAX), WiFi, Global Positioning System (GPS), and Beidou Satellite Navigation System (BDS). In this manner, multiple operators can share the network, thereby saving resources and reducing difficulties in network installation.

Figure 2:
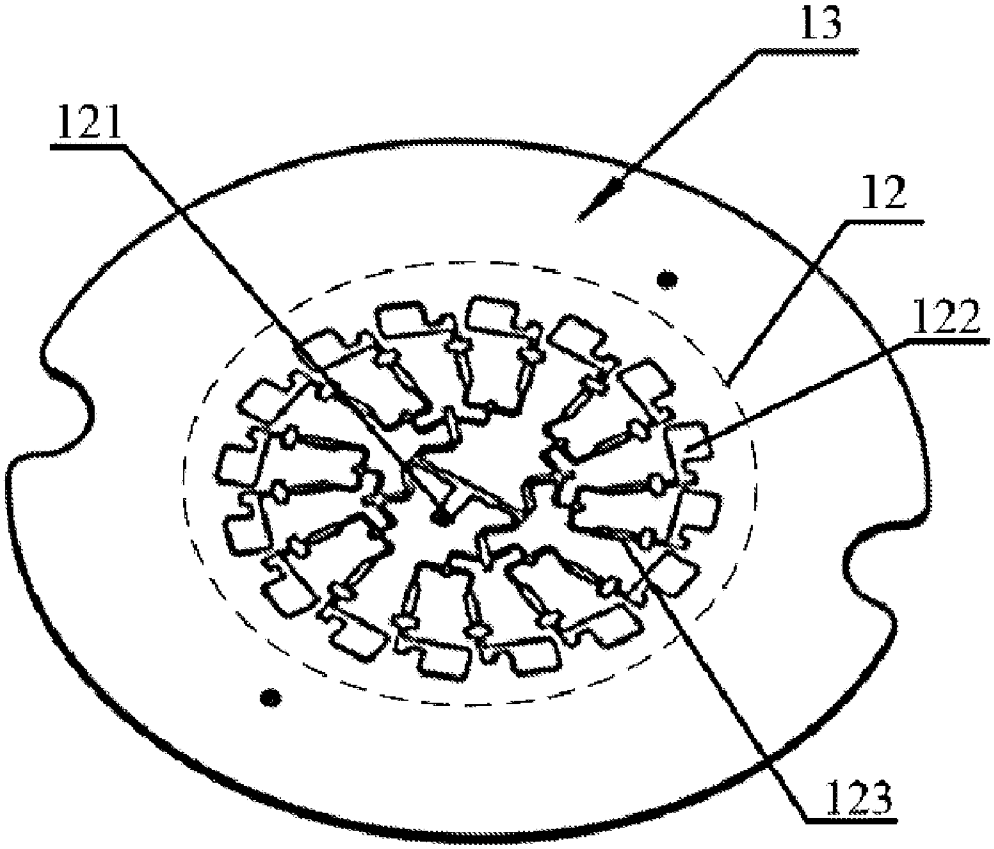
FIG. 2 is a structure view of one side of the single-polarized antenna according to an embodiment of this application.
Figure 3:
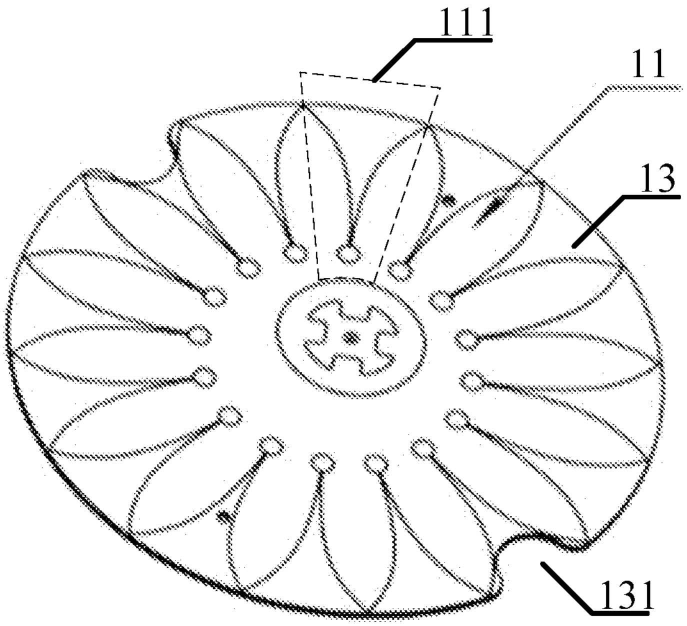
FIG. 3 is a structure view of another side of the single-polarized antenna according to an embodiment of this application.

The solid line part in FIG. 1 is the visible part and the dashed line part in FIG. 1 is the invisible part. In this embodiment, each of the Vivaldi oscillator units is coupled to a corresponding output port 122. The power divider 12 and the Vivaldi oscillator array 11 are separated by an insulation layer, and the power divider 12 and the Vivaldi oscillator array 11 are fixed disposed. In the case where the power divider 12 is visible, the Vivaldi oscillator array 11 is an invisible structure. As shown in FIG. 1, exemplarily, the insulation layer may be a substrate. The power divider 12 is located on one side of the substrate, the Vivaldi oscillator array 11 is located on the other side of the substrate. In this embodiment, the single-polarized antenna may be a flat disk-shaped structure, and the single-polarized antenna has the advantages of being ultra-thin, taking up small space, and strong versatility. Exemplarily, referring to FIG. 2 and FIG. 3, FIG. 2 is a structure view of one side of the single-polarized antenna according to an embodiment of this application and FIG. 3 is a structure view of the other side of the single-polarized antenna according to an embodiment of this application. As shown in FIG. 2, one side of the substrate of the single-polarized antenna is provided with the power divider 12 and the other side of the substrate of the single-polarized antenna is provided with the Vivaldi oscillator array 11. The multiple Vivaldi oscillator units 111 are arranged in a circumferential direction of the Vivaldi oscillator array 11, forming a petal-shaped structure as shown in FIG. 3. The Vivaldi oscillator array 11 is formed by etching an entire metal layer 16, that is, adjacent Vivaldi oscillator units 111 are connected to each other. In an embodiment, eight, or sixteen Vivaldi oscillator units 111 may be provided. Of course, an odd number of, such as fifteen or seventeen Vivaldi oscillator units 111 may be provided. Or at least three Vivaldi oscillator units 111 may be provided as long as the Vivaldi oscillator units 111 can form a circle. The Vivaldi oscillator units 111 are uniformly distributed in a circumferential direction of the Vivaldi oscillator array 11. Within the achievable number range, the more Vivaldi oscillator units 111 are set, the higher the uniformity of radiation is.

Figure 4:
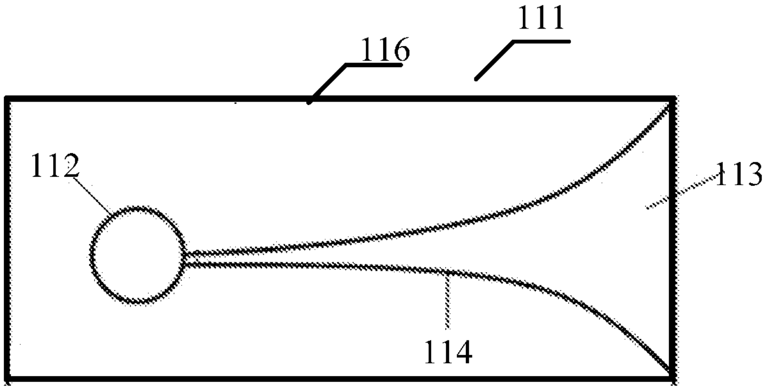
FIG. 4 is a structure view of a Vivaldi oscillator unit according to an embodiment of this application.

In an embodiment, referring to FIG. 4, FIG. 4 is a structure view of a Vivaldi oscillator unit according to an embodiment of this application. The Vivaldi oscillator unit 111 may include a resonant cavity 112 formed by etching a metal layer 16 and a dielectric substrate 113 in communication with the resonant cavity 112. A radiation area is defined by an exponential gradient trough line 114, a rectangular trough line 116, and the resonant cavity 112. Each output port 122 of the power divider 12 is disposed corresponding to a resonant cavity 112 of a respective Vivaldi oscillator unit 111. Referring to FIG. 1, it can be seen that in the direction perpendicular to the substrate, the output ports 122 are coupled and connected to the resonant cavities 112 in a one-to-one correspondence, so as to facilitate feeding the Vivaldi oscillator units 111 through the output ports 122. The feed signal resonates through the resonant cavity 112, and then is amplified and radiated through the dielectric substrate 113, so that directional radiation can be produced. The Vivaldi oscillator units 111 performing directional radiation surround a circle by 360 degrees so that the Vivaldi oscillator array 11 can achieve omnidirectional radiation.

For the entire Vivaldi oscillator array 11, the entire metal layer 16 may be etched so that hollow structures are formed, and thus the resonant cavity 112 and the dielectric substrate 113 of each Vivaldi oscillator unit 111 are formed. The exponential gradient trough line 114 and the rectangular trough line 116 are the edges of a respective and hollow dielectric substrate 113.

In an embodiment, the resonant cavity 112 may be circular, elliptical, or rectangular. FIG. 4 only shows that the resonant cavity 112 has a circular structure. The resonant cavity 112 may also be elliptical, rectangular, or other regular or irregular shapes set according to user requirements.

Figure 5:
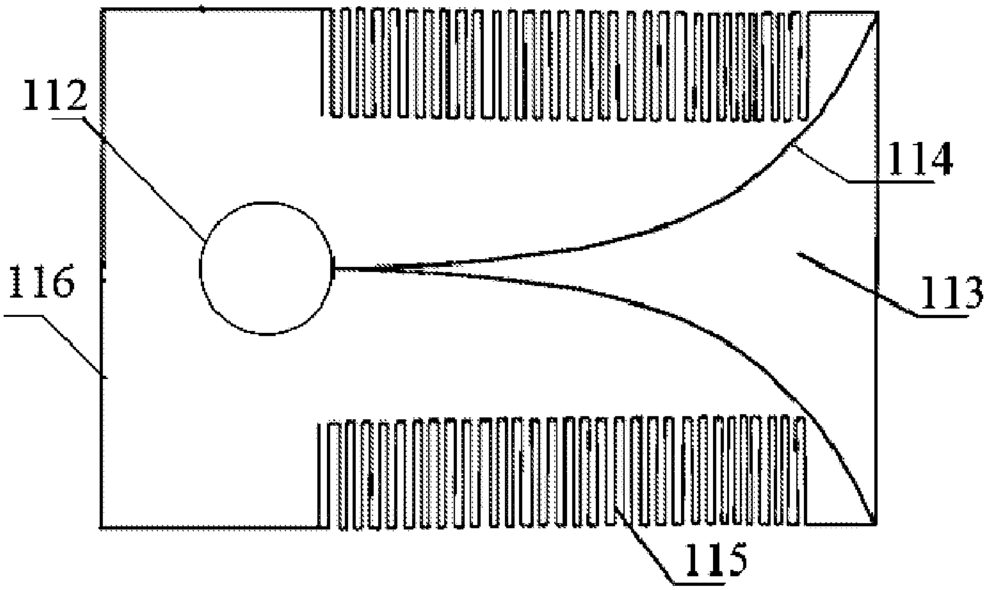
FIG. 5 is a structure view of another Vivaldi oscillator unit according to an embodiment of this application.

In an embodiment, referring to FIG. 5, FIG. 5 is a structure view of another Vivaldi oscillator unit according to an embodiment of this application. The rectangular trough line 116 of each Vivaldi oscillator unit 111 is provided with multiple rectangular corrugated grooves 115. That is to say, the edge of the Vivaldi oscillator unit 111, namely, the metal layer 16 between two adjacent Vivaldi oscillator units 111, may be etched to form the multiple rectangular corrugated grooves 115. Slotting the rectangular trough line 116 of the Vivaldi oscillator unit 111 has the following advantages: first, the current path can be extended, the generation of surface waves can be suppressed, and thus the minimum operating frequency of the antenna can be reduced and the operating frequency band of the antenna can be expanded; second, high-order harmonics can be suppressed so that higher gain and narrower beams can be produced. In this embodiment, the rectangular corrugated grooves 115 are added so that the bandwidth of the single-polarized antenna can be expanded and the performance of the single-polarized antenna can be optimized.

In an embodiment, referring to FIGS. 1 to 3, the single-polarized antenna may further include a first substrate 13. The Vivaldi oscillator array 11 is disposed on the first side of the first substrate 13. The power divider 12 is disposed on the second side of the first substrate 13 facing away from the Vivaldi oscillator array 11.

The single-polarized antenna may include one substrate, namely the first substrate 13. As shown in FIG. 2 and FIG. 3, the Vivaldi oscillator array 11 is disposed on the first side of the first substrate 13. The power divider 12 is disposed on the second side of the first substrate 13 facing away from the Vivaldi oscillator array 11. In this manner, the Vivaldi oscillator array 11 and the power divider 12 are disposed on the same substrate so that the overall thickness of the single-polarized antenna can be reduced. At least a pair of positioning grooves 131 may be disposed at the edge of the first substrate 13. The positioning grooves 131 are configured to fix the position of the single-polarized antenna during installing the single-polarized antenna.

Figure 6:
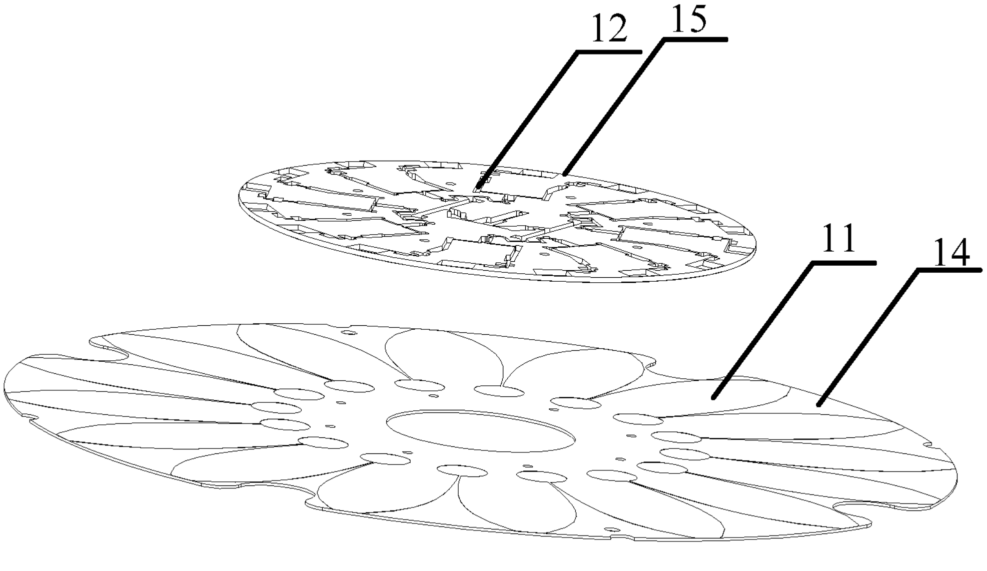
FIG. 6 is an exploded view of another single-polarized antenna according to an embodiment of this application.
Figure 7:
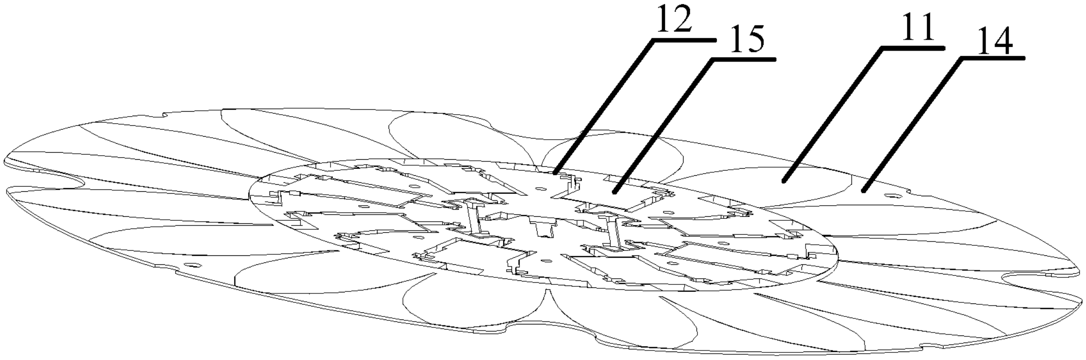
FIG. 7 is a structure view of another single-polarized antenna according to an embodiment of this application.

In an embodiment, as shown in FIG. 6 and FIG. 7, FIG. 6 is an exploded view of another single-polarized antenna according to an embodiment of this application, and FIG. 7 is a structure view of another single-polarized antenna according to an embodiment of this application. The single-polarized antenna may further include a second substrate 14 and a third substrate 15. The second substrate 14 and the third substrate 15 are fixedly connected. The Vivaldi oscillator array 11 is disposed on the second substrate 14. The power divider 12 is disposed on the third substrate 15.

The single-polarized antenna may further include two substrates, namely the second substrate 14 and the third substrate 15. The Vivaldi oscillator array 11 is disposed on the second substrate 14. The power divider 12 is disposed on the third substrate 15. That is, the Vivaldi oscillator array 11 and the power divider 12 are disposed on different substrates, respectively. The power divider 12 and the Vivaldi oscillator array 11 may be integrated and fabricated on the respective substrates, and then the second substrate 14 and the third substrate 15 are fixedly assembled so that the production speed can be sped up. Exemplarily, the second substrate 14 and the third substrate 15 may be screwed together by screws or may be riveted by rivets.

Moreover, the main factor that affects the bandwidth performance is the power divider 12. Therefore, the power divider 12 has relatively high performance requirements for the third substrate 15 on which the power divider 12 is located, and therefore the manufacturing cost of the third substrate 15 is relatively high. The Vivaldi oscillator array 11 has relatively low performance requirements for the second substrate 14 and the second substrate 14 with a relatively low cost may be used so that the production cost of the single-polarized antenna can be reduced. Exemplarily, in order to reduce the substrate material cost of the single-polarized antenna, the diameter of the third substrate 15 may be less than the diameter of the second substrate 14. Exemplarily, the first substrate 13, the second substrate 14, and the third substrate 15 may be printed circuit boards (PCB).

In an embodiment, referring to FIG. 6 and FIG. 7, the Vivaldi oscillator array 11 is disposed on the first side of the second substrate 14 facing toward the third substrate 15, and the power divider 12 is disposed on the first side of the third substrate 15 facing away from the second substrate 14.

The Vivaldi oscillator array 11 is disposed on the first side of the second substrate 14 facing toward the third substrate 15, and the power divider 12 is disposed on the first side of the third substrate 15 facing away from the second substrate 14. In this manner, the Vivaldi oscillator array 11 and the power divider 12 are spaced by only the third substrate 15 so that a better coupling effect can be ensured and the radiation intensity of the electrical signal can be increased. In an embodiment, the Vivaldi oscillator array 11 may also be disposed on the second side of the second substrate 14 facing away from the third substrate 15, and the power divider 12 may be disposed on the first side of the third substrate 15 facing away from the second substrate 14. In this manner, the Vivaldi oscillator array 11 and the power divider 12 are spaced by the second substrate 14 and the third substrate 15. This embodiment does not limit the locations of the Vivaldi oscillator array 11 and the power divider 12.

Figure 8:
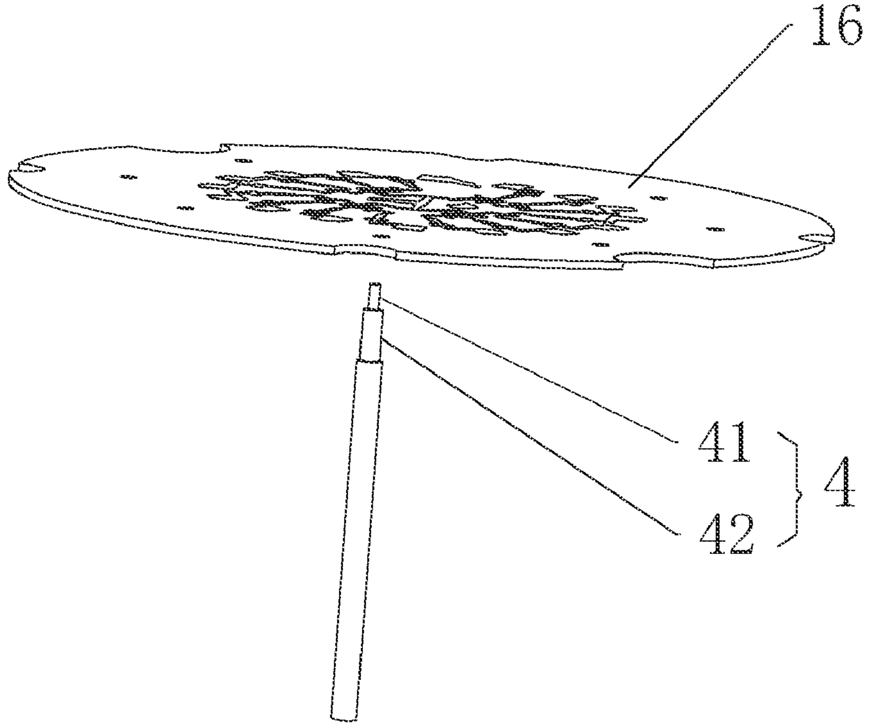
FIG. 8 is a structure view of the single-polarized antenna in FIG. 1 with a cable.
Figure 9:
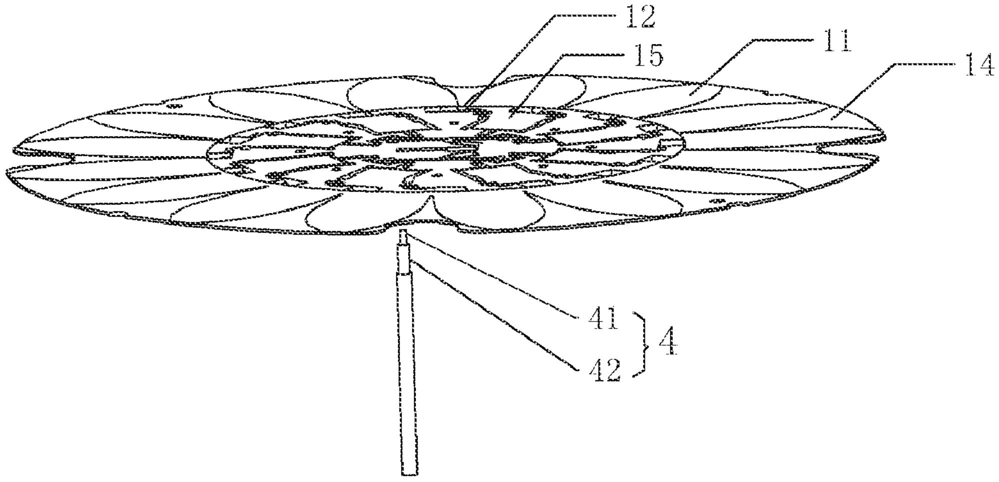
FIG. 9 is a structure view of the single-polarized antenna in FIG. 7 with a cable.

In an embodiment, as shown in FIGS. 8 and 9, the single-polarized antenna may further include a cable 4, the inner conductor 41 of the cable 4 passes through the Vivaldi oscillator array 11 and is electrically connected to the power divider 12, and the outer conductor 42 of the cable 4 is electrically connected to the Vivaldi oscillator array 11. The cable 4 enables the single-polarized antenna to form a signal transmission path so that the horizontally-polarized single-polarized antenna provided in an embodiment of this application can be achieved. In the horizontal direction parallel to the substrate, the single-polarized antenna provided in this embodiment has uniform radiation, and thus has a better omnidirectional characteristic. Exemplarily, this cable 4 is a coaxial cable. It is to be noted that here only one type of cable is exemplarily indicated, and the cable in this application is not limited.

In the case where the single-polarized antenna includes only the first substrate 13, the cable 4 is accessed from the one side of the first substrate 13 where the Vivaldi oscillator array 11 is provided, the outer conductor 42 of the cable 4 is directly electrically connected to the metal layer 16 in the middle of the Vivaldi oscillator array 11, and the inner conductor 41 of the cable 4 passes through the first substrate 13 and is electrically connected to the input port of the power divider 12 on the other side of the first substrate 13.

In the case where the single-polarized antenna includes the second substrate 14 and the third substrate 15, the Vivaldi oscillator array 11 is disposed on one side of the second substrate 14 facing toward the third substrate 15, and the power divider 12 is disposed on one side of the third substrate 15 facing away from the second substrate 14, then the cable 4 is accessed from one side of the second substrate 14 facing away from the third substrate 15, the outer conductor 42 of the cable 4 passes through the second substrate 14 and is directly electrically connected to the metal layer 16 in the middle of the Vivaldi oscillator array 11, and the inner conductor 41 of the cable 4 passes through the second substrate 14 and the third substrate 15 and is electrically connected to the input port of the power divider 12 on one side of the third substrate 15 facing away from the second substrate 14.

What is claimed is:

1. A single-polarized antenna, comprising a power divider and a Vivaldi oscillator array, wherein the Vivaldi oscillator array comprises a plurality of Vivaldi oscillator units uniformly distributed in a circumferential direction of the Vivaldi oscillator array; and wherein the power divider comprises a plurality of output ports in one-to-one correspondence with the plurality of Vivaldi oscillator units, and the plurality of output ports of the power divider are coupled to the plurality of Vivaldi oscillator units in a one-to-one correspondence;

wherein the Vivaldi oscillator array and the power divider are disposed on different substrates, respectively; wherein the single-polarized antenna further comprises a second substrate and a third substrate fixedly connected to the second substrate; wherein, the Vivaldi oscillator array is disposed on the second substrate, and the power divider is disposed on the third substrate;

wherein the Vivaldi oscillator array is disposed on a first side of the second substrate facing toward the third substrate, and the power divider is disposed on a first side of the third substrate facing away from the second substrate; or the Vivaldi oscillator array is disposed on a second side of the second substrate facing away from the third substrate, and the power divider is disposed on the first side of the third substrate facing away from the second substrate; and wherein a diameter of the third substrate on which the power divider is disposed is less than that of the second substrate on which the Vivaldi oscillator array is disposed.

2. The single-polarized antenna of claim 1, wherein each of the plurality of Vivaldi oscillator units comprises a resonant cavity formed by etching a metal layer and a dielectric substrate in communication with the resonant cavity; and a radiation area is defined by an exponential gradient trough line, a rectangular trough line, and the resonant cavity.

3. The single-polarized antenna of claim 2, wherein the resonant cavity is circular, elliptical, or rectangular.

4. The single-polarized antenna of claim 2, wherein the rectangular trough line of the each of the plurality of Vivaldi oscillator units is provided with a plurality of rectangular corrugated grooves.

5. The single-polarized antenna of claim 1, wherein eight, twelve or sixteen Vivaldi oscillator units are provided.

6. The single-polarized antenna of claim 1, further comprising a cable, wherein an inner conductor of the cable passes through the Vivaldi oscillator array and is electrically connected to the power divider; and an outer conductor of the cable is electrically connected to the Vivaldi oscillator array.

* * * * *